United States Patent [19]
Robertson

[11] 3,751,103
[45] Aug. 7, 1973

[54] INTERIOR ASSEMBLY FOR A PICKUP CAMPER

[76] Inventor: Robert H. Robertson, 2640 Heatherwood, Dallas, Tex. 75228

[22] Filed: May 18, 1972

[21] Appl. No.: 254,540

[52] U.S. Cl. .............................. 296/23 R, 296/24 R
[51] Int. Cl. .............................................. B60p 3/38
[58] Field of Search ................. 296/1 F, 24 R, 23 R; 16/7, 8; 52/264

[56] References Cited
UNITED STATES PATENTS

| 3,476,432 | 11/1969 | Aliment | 296/23 R |
| 3,475,048 | 10/1969 | McNamee | 296/23 R |

*Primary Examiner*—Philip Goodman
*Attorney*—D. Carl Richards, Jerry W. Mills et al.

[57] ABSTRACT

The specification discloses an interior assembly for installation in a pickup having a camper cover. A rug is shaped to fit on the bottom of the pickup bed and includes curved side portions which are contoured to cover the wheel well covers of the pickup bed. A pair of elongated side panels are dimensioned to cover the interior sides of the pickup bed and include cutout portions for receiving the wheel covers of the pickup bed. A front panel is dimensioned to cover the bulkhead of the pickup bed. The side and front panels are attached to the interior sides of the pickup bed by screws or the like such that the bottom edges of the panels exert a sufficient downward force upon the edges of the rug to firmly hold the rug in place. A plurality of rectangular cushions are dimensioned for being selectively arranged on the rug as a couch or as a bed. The various portions of the interior assembly may be conveniently packaged as a compact kit for shipment to and installation by the consumer.

17 Claims, 12 Drawing Figures

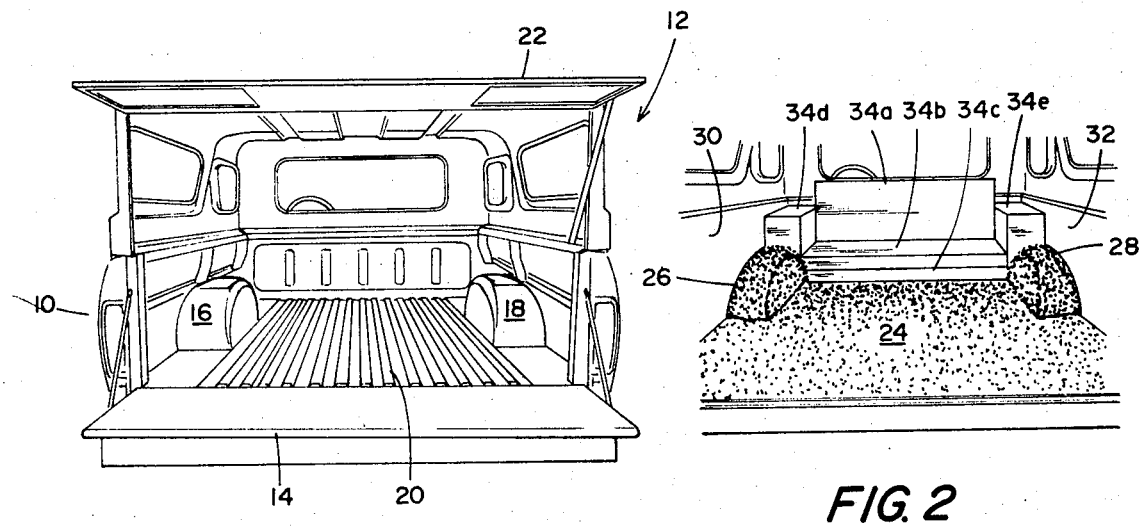
FIG. 1
FIG. 2
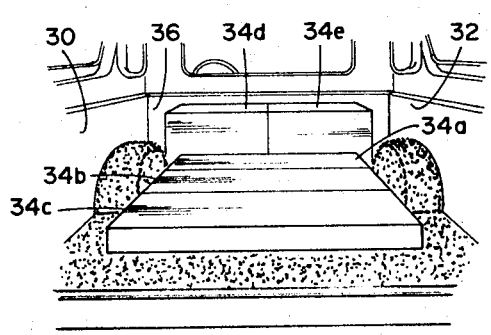
FIG. 3
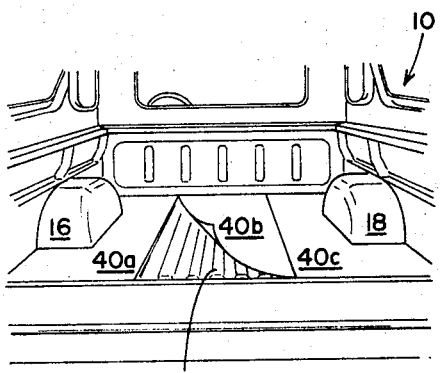
FIG. 4
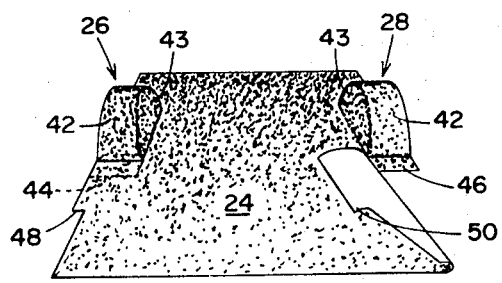
FIG. 5
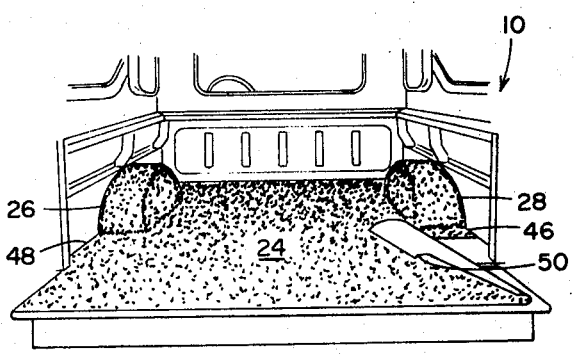
FIG. 6

PATENTED AUG 7 1973 3,751,103

INTERIOR ASSEMBLY FOR A PICKUP CAMPER

FIELD OF THE INVENTION

This invention relates to interior assemblies, and more particularly relates to interior assemblies for installation in pickups having a camper cover.

THE PRIOR ART

A large number of camper covers, sometimes termed pickup toppers, are currently installed over the beds of conventional pickups. The camper covers provide an enclosed area which may be used as sleeping quarters or the like for travel and during hunting and fishing trips. Generally, the interior area within such camper covers is only partially furnished, and often includes only a mattress or a bedroll disposed on the bare metal pickup bed. It has thus been heretofore proposed to utilize rugs to cover the pickup bed within such camper covers, but problems have arisen in affixing the rugs to the pickup bed.

Moreover, the existence of wheel well covers in modern day pickups presents difficulties in covering the entire floor of the pickup camper. It has thus been heretofore proposed to utilize boxes which cover the pickup wheel well covers and which provide side seating. However, such boxes not only utilize a substantial amount of much needed room within the pickup camper, but the boxes have often not provided a pleasing appearance. Moreover, such previously developed boxes have often been difficult to install and have often not been adapted to secure attachment within the pickup bed.

SUMMARY OF THE INVENTION

In accordance with the present invention, a relatively inexpensive interior assembly is provided which may be easily installed within a pickup camper to provide an attractive and comfortable environment. The assembly includes a rug which may be securely maintained in place without the requirement of difficult installation procedures. Moreover, the assembly includes attractive side wall panels which are easily installed and which do not take up an unnecessarily large amount of space within the camper cover. The assembly also includes cushions which may be selectively arranged as a comfortable couch or as a large bed.

In accordance with a specific aspect of the invention, an assembly is provided for installation in a pickup having a camper cover. The assembly includes a rug shaped to cover the bottom of the pickup bed and includes curved side portions which are contoured to cover the wheel well covers of the pickup bed. A pair of elongated side panels are dimensioned to cover the interior sides of the pickup bed and include cutout portions for receiving the wheel well covers of the pickup bed. A front panel is dimensioned for covering the bulkhead of the pickup bed and for interfitting between the ends of the side panels. Fasteners are provided to attach the side and front panels to the interior sides of the pickup bed such that the bottom edges of the side and front panels exert a sufficient downward force on the edges of the rug to firmly hold the rug in place. A plurality of cushions are dimensioned to be selectively arranged on the rug as a couch or as a bed.

In accordance with another aspect of the invention, an assembly is provided for converting the interior of a pickup camper and includes a floor covering shaped to cover substantially the entire bottom of the pickup bed. The floor covering includes contoured side portions for covering the wheel well covers of the pickup bed. A pair of elongated side panels are dimensioned to cover the interior sides of the pickup bed and to generally mate at the upper edges thereof with the bottom of the camper top. The side panels include cutout portions for receiving the wheel well covers. Support members are mounted on the back of the side panels for abutting with the interior sides of the pickup bed. Fasteners are provided to attach the side panels to the interior sides of the pickup bed such that the bottom edges of the side panels exert a downward force sufficient to maintain the floor covering in the desired location. A plurality of rectangular cushions are dimensioned for being arranged in the front of the pickup bed to form a couch having a horizontal seat and a vertical back or to form a bed having a substantially continuous horizontal surface.

DESCRIPTION OF THE DRAWINGS

For a more complete understanding of the present invention and for further objects and advantages thereof, reference is now made to the following description taken in conjunction with the accompanying drawings, in which:

FIG. 1 is a perspective view of the rear of a pickup having a camper cover, prior to the installation of the present interior assembly;

FIG. 2 is a perspective view of the pickup shown in FIG. 1 after the installation of the present interior assembly, the cushions of the assembly being arranged in a couch configuration;

FIG. 3 is a perspective view similar to that of FIG. 2 but with the cushions arranged as a bed;

FIG. 4 is a perspective view of the rear of a pickup having a camper cover, illustrating the initial installation of floor panels according to the invention;

FIG. 5 is a perspective view of the carpet of the present assembly;

FIG. 6 is a perspective view of the rear of a pickup camper illustrating the installation of the carpet shown in FIG. 5;

DESCRIPTION OF THE PREFERRED EMBODIMENT

Figure 7:
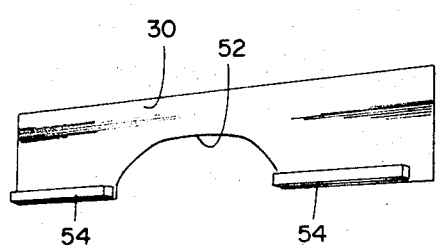
FIG. 7 is a perspective view of the rear of one of the side panels of the present assembly.

FIG. 1 illustrates the rear of a conventional pickup designated generally by the numeral 10 having a camper cover 12 mounted thereon. Pickup 10 may comprise any one of a number of current pickup models and includes a tailgate 14, wheel well covers 16 and 18, and a corrugated bed bottom 20.

The camper cover or topper 12 may comprise any one of a number of commercially available assemblies.

For example, the camper cover termed the Lincoln Topper, manufactured and sold by Lincoln Industries, Inc., of Stroud, Okla., works well with the present assembly in practice. However, the present assembly is adaptable to use with a wide variety of different makes of pickups and different types of camper covers. Generally, camper cover 12 is constructed from fiber glass and includes a number of windows defined along the sides thereof, along with a movable rear gate member 22. As may be seen from FIG. 1, the interior of a conventional unadorned pickup camper cover is comprised of relatively unattractive metal, glass and fiber glass walls. Not only are the metal bottom and side walls of the pickup unattractive and uncomfortable, the rigidity of the walls presents a safety hazard for travel within the camper cover.

As shown in FIG. 2, the installation of the present assembly converts the interior of a conventional pickup camper into an attractive and comfortable space which enables one or more passengers to ride and sleep in safety during travel. As shown in FIG. 2, the present interior kit includes a plush shag carpet or rug 24 which is dimensioned to cover the bottom of the pickup bed. The carpet 24 includes curved side portions 26 and 28 which are contoured to cover the wheel well covers 16 and 18. Attractive wood side panels 30 and 32 extend along the interior sides of the pickup bed. As will be later described, the side panels 30 and 32 not only cover the rigid interior walls of the pickup bed, but also the bottom edges of the panels apply a downward force on the carpet 24 in order to maintain the carpet 24 in position without the requirement of tape or other fastening devices.

Another important aspect of the present interior assembly is the provision of five cushions 34a–e which may be selectively arranged either as a couch, as shown in FIG. 2, or as a bed, as shown in FIG. 3. When cushions 34a–3 are arranged as a couch, cushion 34a forms a couch back, while cushions 34b and 34c are stacked upon one another to form the couch seat. Cushions 34d and 34e are dimensioned to fit between the wheel well covers 16 and 18 and the bulkhead of the pickup in order to serve as couch armrests or ends. The cushion 34a in FIG. 2 rests against a front panel 36 which is secured to the bulkhead of the pickup bed in a manner to be subsequently described.

FIG. 3 shows the arrangement of the cushions 34a–e as a bed. The cushions 34d–e are dimensioned to be placed end-to-end to form a headboard for the bed. The cushions 34a–c may be placed side-by-side to form a generally horizontal bed surface. As will be subsequently described, cushions 34b–c are joined along one edge thereof to prevent separation of the cushions. It will be seen from inspection of FIGS. 2–3 that the carpeted bottom and wheel well covers of the pickup bed provide a soft and attractive interior. As will be subsequently described, the side panels 30 and 32 and the front panel 36 include shock absorbing members on the rear thereof to provide a safe enclosure for passengers.

FIG. 4 illustrates the first step in installing the present assembly. Three plywood panels 40a–c are placed over the corrugated bottom 20 of the pickup bed. Panels 40a and 40c include cutout portions to receive the wheel well covers 16 and 18. Panels 40a–c provide a smooth foundation for receiving the carpet of the assembly. No fastening structure is required to maintain the panels 40a–c in place.

FIG. 5 illustrates the carpet 24 utilized for the invention. Carpet 24 may be folded into a relatively compact space for ease in shipping and storage. The carpet 24 may comprise any type of suitable floor covering, but in the preferred embodiment it comprises a high quality plush shag carpet. In construction, a one-piece flat body of carpet is cut with an outside shape for fitting within the desired model pickup bed. The side portions 26 and 28 each comprise an upper longitudinal strip 42 joined along one edge to a semicircular side 43. In the preferred embodiment, the upper strips 42 and sides 43 are sewn together. The side portions 26 and 28 are then sewn or heat-sealed to the main flat body of carpet. An important aspect of the invention is that flap portions 44 and 46 extend from the strips 42 of the side portions. Corresponding flaps 48 and 50 formed in the main body of carpet are then folded over the flaps 44 and 46 in order to securely maintain the side portions 26 and 28 in place on the wheel well covers. It has been found that this particular flap configuration, in combination with the side panels to be subsequently described, eliminate slippage of the carpet after installation.

FIG. 6 illustrates the simplicity of installation of the carpet 24. The carpet is merely dropped into place on the bottom of the pickup bed, and the side portions 26 and 28 are securely placed over the wheel well covers of the pickup. The flaps 44 and 46 are then covered by the corresponding flaps 48 and 50. No additional adhesion or fastening devices are required to mount the carpet. This enables the assembly to be easily installed and removed in case it is desired to haul industrial of farm loads within the pickup.

FIG. 7 illustrates a back view of the side panel 30. Panel 30 is identical to the corresponding side panel 32, and is preferably comprised of a high grade plywood panel having a cutout portion 52 for receiving the wheel well cover of the pickup. Polystyrene strips 54 are mounted along the lower portion of the panel 30 for abutment with the interior sides of the pickup bed. The polystyrene strips 54 thus enable the panel to be securely mounted adjacent the interior walls of the pickup bed, and provide a resiliency for abosrbing shock. Due to the lightness of the panel 30 and the polystyrene strips 54, the panel may be easily shipped and installed. It will be understood that other types of resilient backing material may be utilized in place of the polystyrene strips 54.

Figure 8:
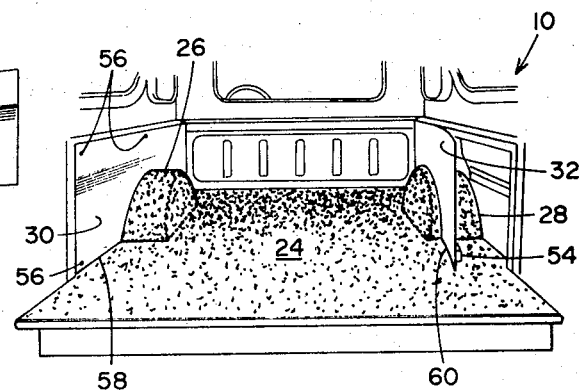
FIG. 8 is a perspective view of the rear of the pickup camper shown in FIG. 6 illustrating the installation of the side panels of the assembly.

In installation of the side panels 30 and 32, the front ends of the panels are positioned against the bulkhead of the pickup as shown in FIG. 8. The rear ends of the panels are then pulled into place over the wheel well covers. Once the side panels 30 and 32 are properly positioned, three conventional screws 56 are used to firmly connect the panels to the interior sides of the pickup bed. Due to the particular construction of the assembly, only three screws are required and no screws are required to fasten the forward ends of the panels in place. Thus, the panels 30 and 32 may be quickly and easily installed and removed. It will be noted that the upper edges of the panels 30 and 32 generally mate with the bottom of the camper top to provide a pleasing appearance.

An important aspect of the invention is that the bottom edges 58 and 60 of the installed panels 30 and 32 exert a downward force upon the sides of the carpet 24. This downward force is sufficient to maintain the carpet in place without the requirement of adhesive fastening means or the like. In particular, the downward force upon the flaps 44–50 maintain the side portions 26 and 28 firmly in place. In effect, the bottom edges 58 and 60 of the side panels act as knife edges for clamping the edges of the carpet 24 in place.

Figure 9:
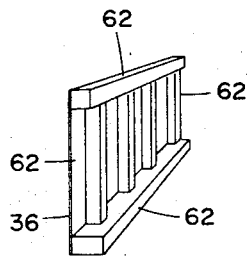
FIG. 9 is a perspective view of the rear of the front panel of the assembly.
Figure 10:
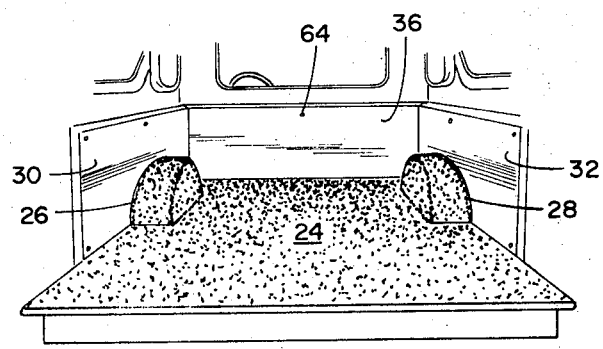
FIG. 10 is a perspective view similar to that shown in FIG. 8 after the installation of the front panel of the assembly.

FIG. 9 illustrates a rear view of the front panel 36. Front panel 36 is dimensioned for covering the front bulkhead of the pickup bed and for interfitting between the ends of the side panels 30 and 32. The front panel 36 thus eliminates the requirement for fastening screws in the front ends of the panels 30 and 32. The back of the front panel 36 includes a plurality of polystyrene strips 62 which are attached with glue or the like and which abut against the bulkhead of the pickup bed to maintain the front panel 36 in a vertical position. The installed front panel 16 thus provides a resilient cushion between the panel 36 and the bulkhead. The front panel 36 is attached with a fastening screw 64.

Figure 11:
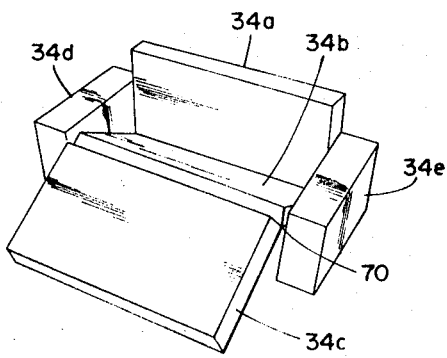
FIG. 11 is a perspective view of the cushions of the assembly during arrangement as a couch.
Figure 12:
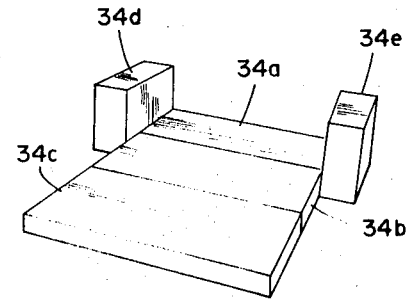
FIG. 12 is a perspective view of the cushions of the assembly when arranged as a bed.

FIGS. 11 and 12 illustrate the convertibility of the present cushions 34a–e from a couch to a bed. The end cushions 34d and 34e are dimensioned to interfit between the wheel well covers and the bulkhead of the pickup. Cushion 34a is adapted to firmly fit against the front panel 36 to form a couch back. The cushions 34b and 34c are hinged along an edge 70 by a piece of fabric so that the cushions 34b and 34c may be vertically stacked and not shift relative to one another during movement of the pickup. Cushion 34a is not hinged to cushions 34b–c so that the couch may be arranged without a void in the lower back portion thereof.

When it is desired to make the cushions 34a–c into a bed, the cushions 34b and 34c are shifted relative to one another in the manner shown in FIGS. 11 and 12. The cushions 34a–c are arranged flat on the surface of the carpet 24 to define a horizontal bed surface. End cushions 34d –e may either be positioned as shown in FIG. 12 or positioned as shown in FIG. 3 as a headboard.

The present assembly may be stored and shipped in a relatively compact packeage and may be quickly and easily installed in any conventional pickup camper. The assembly provides an attractive and comfortable interior for a number of passengers and includes cushions which may be used as a couch or as a bed. The installed assembly provides a soft and resilient interior wherein passengers can ride and sleep in quiet safety. The assembly may be easily removed when it is desired to haul loads in the pickup camper.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. An assembly for installation in a pickup having a camper cover comprising:
    a rug shaped to fit on the bottom of the pickup bed and including curved side portions which are contoured to cover the wheel well covers of the pickup bed,
    a pair of elongated side panels dimensioned to cover the interior sides of the pickup bed and including cutout portions for receiving the wheel well covers of the pickup bed,
    a front panel dimensioned for covering the bulkhead of the pickup bed and for interfitting between the ends of said side panels,
    connecting means for attaching said side and front panels to the interior sides of the pickup bed such that the bottom edges of said side and front panels exert a sufficient downward force on the edges of said rug to firmly hold said rug in place, and
    a plurality of cushions dimensioned for being selectively arranged on said rug as a couch and as a bed.

2. The assembly of claim 1 and further comprising:
    a rigid floor member for being disposed between said rug and the bottom of the pickup bed.

3. The assembly of claim 2 wherein said floor member comprises a plurality of elongated panels.

4. The assembly of claim 1 wherein said curved side portions of said rug comprise:
    a semicircular side integrally connected along the lower edge to said rug,
    an upper strip joined along one edge to said semicircular side and including a flap at the rearward lower end thereof,
    said flap being tucked beneath a portion of said rug during installation to secure said curved side portions upon the wheel well covers.

5. The assembly of claim 1 and further comprising:
    resilient blocks attached to the backs of said side and front panels for abutting against the interior sides of the pickup bed.

6. The assembly of claim 1 wherein the upper edges of said side panels generally mate with the lower edge of the camper cover.

7. The assembly of claim 1 wherein said rectangular cushions comprise:
    a pair of cushions joined along one edge to prevent relative slippage when said pair are stacked one upon the other for use as a couch seat,
    a third cushion for use as a couch back, and
    fourth and fifth cushions for use as couch ends and for a bed headboard.

8. An assembly for converting the interior of a pickup camper comprising:
    a floor covering shaped to cover substantially the entire bottom of the pickup bed and including contoured side portion for covering the wheel well covers of the pickup bed,
    a pair of elongated side panels dimensioned to cover the interior sides of the pickup bed and to generally mate at the upper edges thereof with the bottom of the camper top,
    said side panels having cutout portions for receiving the wheel well covers,
    support members mounted on the back of said side panels for abutting with the interior sides of the pickup bed,
    fastening means for attaching said side panels to the interior sides of the pickup bed such that the bottom edges of said side panels exert a downward force sufficient to maintain said floor covering in the desired location,
    a plurality of rectangular cushions dimensioned for being arranged in the front of the pickup bed to form a couch having a horizontal seat and a vertical back or to form a bed having a substantially continuous horizontal surface.

9. The assembly of claim 8 wherein said floor covering comprises a carpet.

10. The assembly of claim 9 and further comprising rigid floor paneling fitting between said carpet and the floor of the pickup bed.

11. The assembly of claim 8 wherein said support members comprise resilient blocks shaped to maintain said side panels in a vertical position flush against the upper edges of the pickup bed.

12. The assembly of claim 8 wherein said fastening means comprise screws extending through said side panels into the sides of the pickup bed.

13. The assembly of claim 8 wherein said floor covering is maintained in place solely by the force exerted by said side panels without the requirement of additional fastening.

14. The assembly of claim 8 wherein said cushions comprise:
a pair of cushions joined along one edge to prevent relative slippage when said pair are stacked one upon the other for use as a couch seat,
a third cushion for use as a couch back, and
fourth and fifth cushions for use as couch ends and for a bed headboard.

15. The assembly of claim 14 wherein said fourth and fifth cushions have a length generally equal to the distance between the wheel well covers and the front of the pickup, the combined length of said fourth and fifth cushions being approximately equal to the width of the pickup bed, wherein said fourth and fifth cushions may be used as individual couch ends or placed end-to-end and used as a bed headboard.

16. An interior assembly for installation in a pickup having a camper cover comprising:
a rug shaped to cover the bottom of the pickup bed,
a pair of elongated side panels dimensioned to cover the interior sides of the pickup bed and for generally mating at the upper edges thereof with the bottom edge of the camper cover, and
a front panel dimensioned for covering the bulkhead of the pickup bed and for generally interfitting between ends of the said side panels,
said side and front panels being attachable to the interior sides of the pickup bed by fasteners such that the bottom edges of the side and front panels exert a sufficient downward force on the edges of said rug to firmly hold said rug in place.

17. An interior assembly for installation in a pickup having a camper cover comprising:
a rug shaped to cover the bottom of the pickup bed,
a pair of side panels dimensioned to cover at least the forward portion of the interior sides of said pickup bed,
cushion means having a length to extend across said pickup bed to form the seat and back of a couch,
end cushions for fitting between said side panels and said cushion means to support said couch,
said cushion means being adaptable to being arranged as a bed on the floor of said pickup bed.

* * * * *